(12) United States Patent
Ichinokawa

(10) Patent No.: US 9,658,450 B2
(45) Date of Patent: May 23, 2017

(54) VEHICLE HEADS-UP DISPLAY DEVICE

(71) Applicant: Honda Motor Co., Ltd., Tokyo (JP)

(72) Inventor: Jumpei Ichinokawa, Rolling Hills Estates, CA (US)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 14/704,014

(22) Filed: May 5, 2015

(65) Prior Publication Data

US 2016/0327786 A1 Nov. 10, 2016

(51) Int. Cl.
*G02B 27/14* (2006.01)
*G02B 27/01* (2006.01)

(52) U.S. Cl.
CPC ..... *G02B 27/0101* (2013.01); *G02B 27/0149* (2013.01); *G02B 27/14* (2013.01)

(58) Field of Classification Search
CPC .......... G02B 27/0101; G02B 2027/014; G02B 2027/0149
USPC .................................................. 359/629–633
See application file for complete search history.

(56) References Cited

U.S. PATENT DOCUMENTS

| | | | | |
|---|---|---|---|---|
| 5,305,011 A * | 4/1994 | Furuya | .................. | B60K 35/00 340/980 |
| 6,402,321 B1 * | 6/2002 | Harter, Jr. | .......... | G02B 27/0101 345/7 |
| 7,095,562 B1 | 8/2006 | Peng et al. | | |
| 7,671,851 B1 * | 3/2010 | Pryor | .................... | B60K 35/00 345/173 |
| 2011/0001329 A1 * | 1/2011 | Froeschle | ............. | B60J 1/2008 296/76 |
| 2012/0184196 A1 * | 7/2012 | Kasai | .................. | B60H 1/3407 454/121 |
| 2013/0120825 A1 | 5/2013 | Lambert et al. | | |
| 2013/0188260 A1 * | 7/2013 | Matsushita | ........... | B60K 35/00 359/632 |
| 2014/0139928 A1 * | 5/2014 | Piehler | .............. | G02B 27/0101 359/631 |
| 2015/0054760 A1 | 2/2015 | Amaru et al. | | |

FOREIGN PATENT DOCUMENTS

| | | | | |
|---|---|---|---|---|
| DE | EP 2133651 A2 * | 12/2009 | .............. | F41G 1/40 |
| JP | 2003118426 | 4/2003 | | |
| JP | 4270087 | 5/2009 | | |
| JP | 2014162343 | 9/2014 | | |
| WO | 2014155589 | 2/2014 | | |

* cited by examiner

*Primary Examiner* — Scott J Sugarman
*Assistant Examiner* — Daniele Manikeu
(74) *Attorney, Agent, or Firm* — Rankin, Hill & Clark LLP

(57) ABSTRACT

A vehicle system includes a heads-up display device for use in a motor vehicle displays graphic elements in view of an occupant while the occupant views an environment through a display screen of the heads-up display device. The heads-up display device includes a projector configured to project a graphic element on the display screen through at least one reflector housed within a dashboard. The dashboard further houses an air duct for directing air flow within a passenger compartment. A light-transmitting section of the air duct is formed of a light-transmitting material adapted to allow light projected from the projector to pass therethrough.

18 Claims, 3 Drawing Sheets

VEHICLE HEADS-UP DISPLAY DEVICE

BACKGROUND

To improve driver convenience, a vehicle may be provided with a heads-up display (HUD) device which displays information to a vehicle occupant, particularly the driver. The information displayed by the HUD device may be projected onto a surface of the windshield of the vehicle so as to present the information in the driver's view while the driver is driving. By displaying the information in the driver's view, the driver does not need to look away from the windshield (e.g., toward an instrument display on a center dashboard) while driving to see the presented information.

The HUD device may present vehicle information typically displayed in the vehicle's center dashboard, such as information related to the vehicle's speed, fuel level, engine temperature, etc. Additionally, the HUD device may also present map information and communication events (e.g., navigation instructions, warnings and alerts, etc.) to the driver. The vehicle HUD device may present the information to the driver in a manner similar to that employed by the vehicle dashboard, such as by displaying gauges and text boxes which appear as graphic elements on the windshield. Additionally, the vehicle HUD device may present augmented reality graphic elements which augment a physical environment surrounding the vehicle with real-time information.

However, current HUD devices used in vehicles can be limited, specifically those HUD devices that are partially placed within a steering compartment of the dashboard. These HUD devices can occupy needed space within the dashboard often times resulting in reduced component sizes or alternate locations for other vehicle hardware.

BRIEF DESCRIPTION

In accordance with one aspect, a vehicle system comprises a heads-up display device for use in a motor vehicle displays graphic elements in view of an occupant while the occupant views an environment through a display screen of the heads-up display device. The heads-up display device includes a projector configured to project a graphic element on the display screen through at least one reflector housed within a dashboard. The dashboard further houses an air duct for directing air flow within a passenger compartment. A light-transmitting section of the air duct is formed of a light-transmitting material adapted to allow light projected from the projector to pass therethrough.

In accordance with another aspect, a vehicle dashboard assembly configured for use with a heads-up display device comprises a dashboard and a heads-up device housed within the dashboard. The heads-up device is configured to a display graphic element onto a vehicle window surface in view of an occupant, which reflects the graphic element toward the occupant. The heads-up display device includes a projector configured to project the graphic element and at least one reflector configured to reflect the graphic element onto the window surface. A first air duct for directing air flow within a passenger compartment includes a first light-transmitting section housed within the dashboard and positioned between the projector and the at least one reflector. The first light-transmitting section is formed of a light-transmitting material adapted to allow transmission of light therethrough.

In accordance with yet another aspect, a method for presenting a graphic image in a heads-up display onto a window surface of a vehicle windshield is provided. The method comprises projecting a graphic element from a projector to at least one reflector housed within a dashboard; reflecting the graphic element toward the window surface; and transmitting at least one reflected graphic element through a light-transmitting section of an air duct housed within the dashboard.

DETAILED DESCRIPTION

It should, of course, be understood that the description and drawings herein are merely illustrative and that various modifications and changes can be made in the structures disclosed without departing from the present disclosure. In general, the figures of the exemplary vehicle heads-up display are not to scale. It will also be appreciated that the various identified components of the exemplary vehicle heads-up display disclosed herein are merely terms of art that may vary from one manufacturer to another and should not be deemed to limit the present disclosure.

Figure 1:
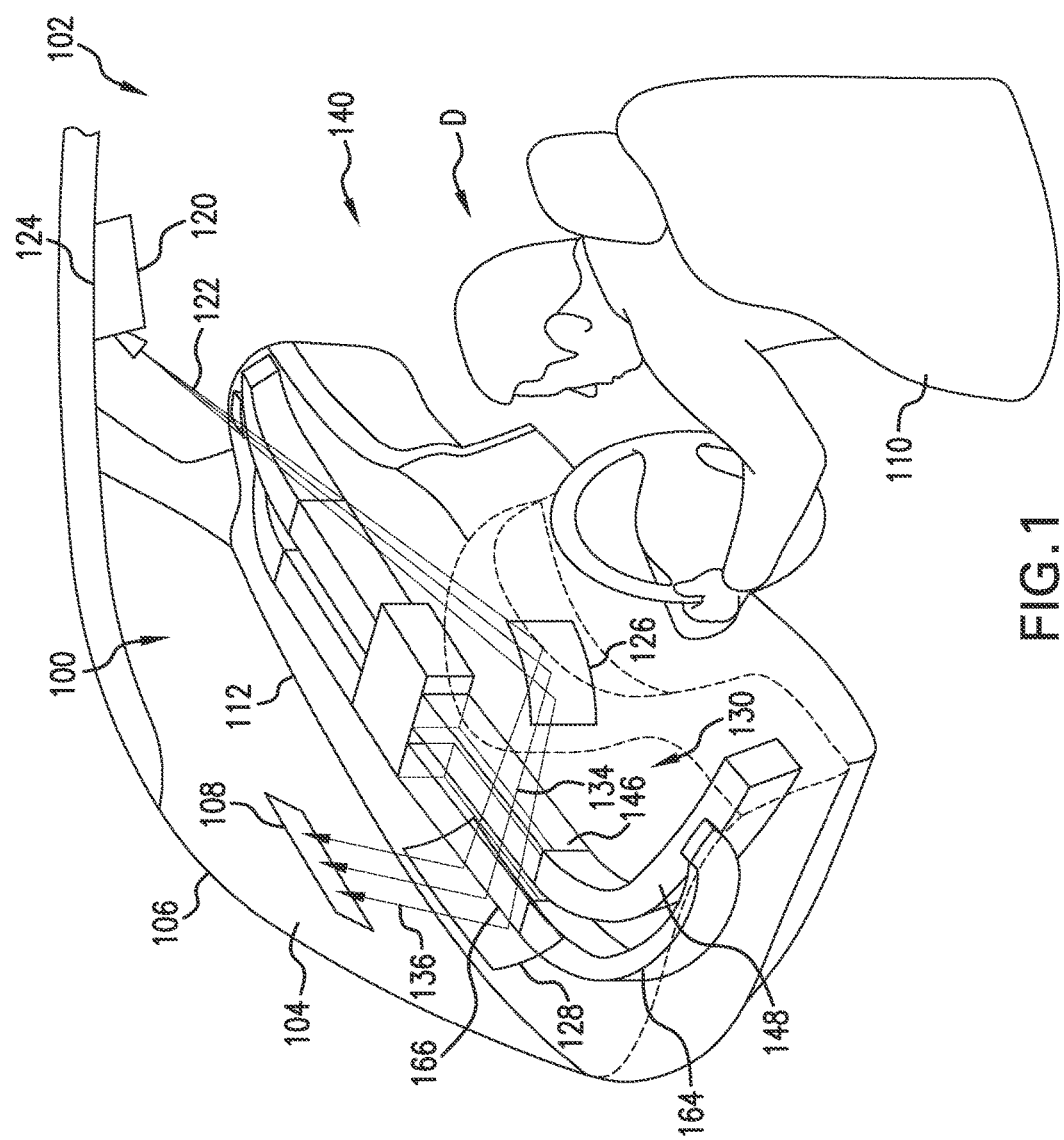
FIG. 1 is a perspective schematic view of an exemplary heads-up display for use in a motor vehicle according to one aspect of the present disclosure.
Figure 2:
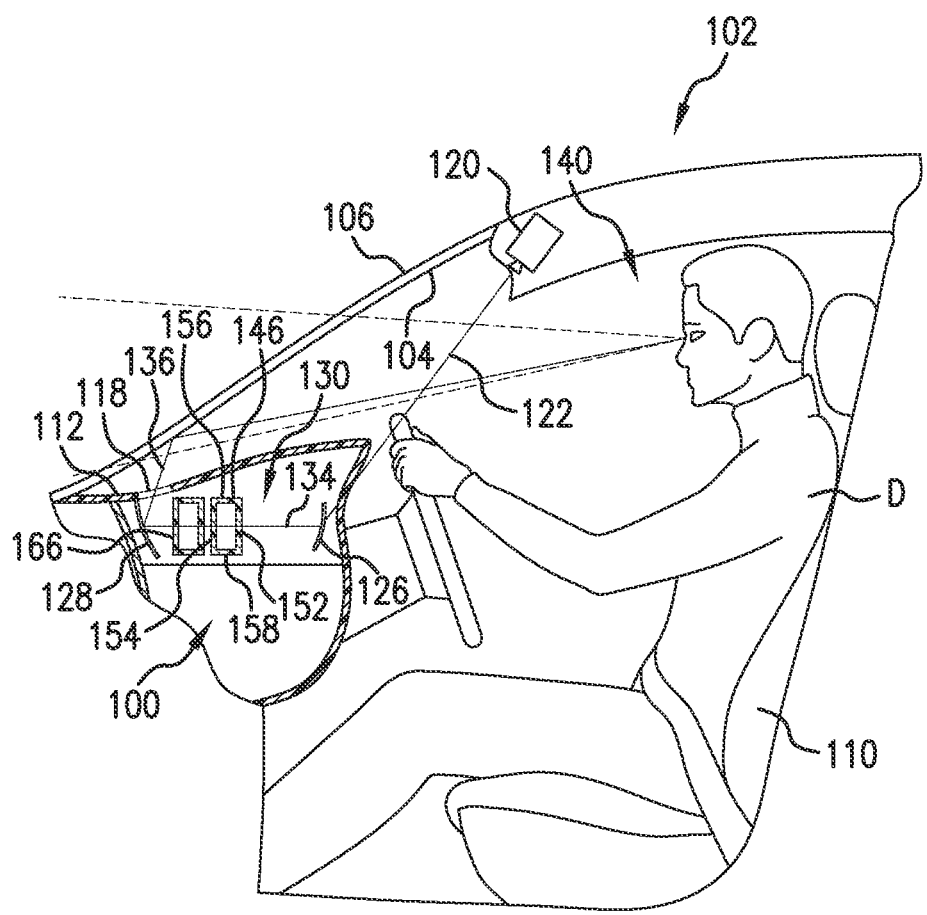
FIG. 2 is a side schematic view, in partial cross-section, of the exemplary heads-up display of FIG. 1.

Referring now to the drawings, wherein like numerals refer to like parts throughout the several views, FIGS. 1 and 2 illustrate a heads-up display device ("HUD device") 100 configured to display information associated with operation of a vehicle 102 (only a portion of which is shown in FIG. 1) to a vehicle occupant, particularly a driver D. The information displayed by the HUD device 100 may be projected onto a surface 104 of a windshield 106, which may be used as a display screen for the HUD device 100, as virtual graphic elements or images 108. The surface 104 can reflect these graphic elements or images 108 toward the driver, so as to present the information in the driver's view while the driver is driving the vehicle. The HUD device 100 is provided in the vehicle 102, which includes a driver seat 110, a dashboard 112, and the windshield 106. It should be appreciated that the configuration of the vehicle 102, particularly with respect to the relative positioning of the driver seat 110, dashboard 112, and windshield 106, may be conventional. To accommodate the HUD device 100, the dashboard 112 defines an internal housing space in which at least part of the HUD device 100 is housed. The HUD device 100 projects the graphic elements or images through an exit aperture 118 defined in the dashboard 112 to the surface 104 of the windshield 106.

Figure 3:
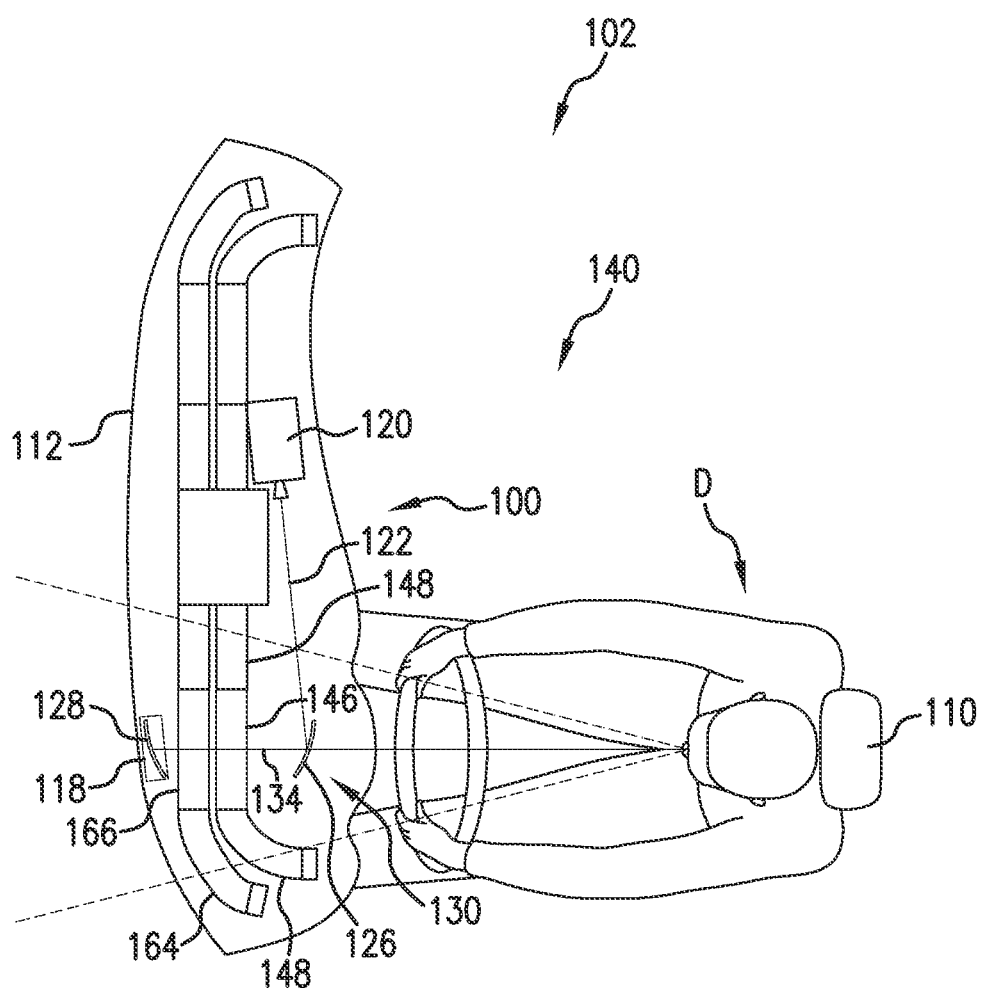
FIG. 3 is a top schematic view of an exemplary heads-up display for use in a motor vehicle according to another aspect of the present disclosure.

The HUD device 100 generally comprises a projector 120 configured to project a graphic element or image on the display screen (e.g., windshield surface 104) via at least one reflector housed within the dashboard 112. The projector 120 may take the form of any light-emitting unit capable of projecting a graphic element or image in the form of a light beam 122. In the depicted embodiment of FIGS. 1 and 2, the projector 120 is external of the dashboard 112 and can be mounted to a roof member 124 such that the projector 120 is located generally overhead of the driver D. In the depicted embodiment of FIG. 3, the projector 120 is housed within the dashboard 112 and is laterally spaced in a vehicle width direction from the at least one reflector. Further to these embodiments, the at least one reflector housed in the dashboard 112 can include a first reflector 126 and a second reflector 128 spaced from the first reflector in a longitudinal direction, e.g. travel direction of the vehicle 102. The first and second reflectors 126, 128 are housed in an internal steering compartment 130 of the dashboard 112. As depicted, the first reflector 126 is oriented with respect to the projector 120 such that a first line of reflection 134, or plurality thereof, of the projected light beam 122, or plurality thereof, from the first reflector 126 is directed toward the second reflector 128. The second reflector 128 is oriented with respect to the first reflector 126 such that a second line of reflection 136, or plurality thereof, of the projected light beam 122 from the second reflector is directed through the dashboard exit aperture 118 toward the windshield surface 104.

It should be appreciated that a controller (not shown) can be operably associated with the HUD device 100. The controller may be one or more computers, (arithmetic) processors, or any other devices capable of communicating with a vehicle control system and controlling the HUD device 100. The vehicle control system may take the form(s) of any vehicle control system used to actively or passively facilitate control of the vehicle 102. The vehicle control system may include or communicate with one or more sensors (not shown) which detect driving and environmental conditions related to the operation of the vehicle 102. With general reference to the operation of the HUD device 100, the controller 104 communicates with the vehicle control system, and based on the communication with the vehicle control system, determines the type and position of graphic elements or image 108 to be presented to the driver D of the vehicle 102.

By way of example only, the vehicle control system may include processing and sensors capable of performing the following functions: hazard or obstacle detection; navigation; driving instruction; and vehicle surrounding (blindspot) monitoring. It is to be appreciated that the vehicle control system may also include processing and sensors capable of performing other vehicle control functions (e.g., highway merge assist, etc.), which may alternatively or additionally be tied to information presented to the driver using the HUD device 100. Regardless of the functions performed by the vehicle control system, it is to be appreciated that the precise manner of operation of the vehicle control system to perform the above functions, including the associated sensors and processing, may not be relevant to the operation of the HUD device 100. Accordingly, further description of the operation of the vehicle control system is omitted for conciseness.

With reference again to FIGS. 1-3, the dashboard 112 can further house at least one air duct of the vehicle HVAC system for directing air flow within a passenger compartment 140 of the vehicle 102. As it particularly relates to the exemplary HUD device 100, a light-transmitting section 146 of an air duct 148 is positioned between the projector 120 and the at least one reflector, and more particularly, is interposed between the first and second reflectors 126, 128 in the longitudinal direction. To allow for the transmission of the light beam 122 from the first reflector 126 toward the second reflector 128, the light-transmitting section 146 of the air duct 148 is formed of a light-transmitting material adapted to allow the light beam 122 projected from the projector 120 to pass therethrough. It should be appreciated that the term, "light-transmitting" refers to a material having the ability to pass light either through itself or through openings in the material, wherein the material may be transparent (colorless or tinted), translucent, or opaque with openings. According to one aspect, at least a pair of opposed sidewalls 152, 154 of the air duct section 146 is formed of a light-transmitting material, and upper and lower walls 156, 158 of the section 146 (in a vehicle height direction) can be formed of an opaque material. According to another aspect, the entirety air duct section 146 can be formed of a light-transmitting material. With the location of the air duct section 146 between the first and second reflectors 126, 128, the first line of reflection 134 is at an angle substantially normal to the sidewalls 152, 154 of the air duct section 146. This allows for an unimpeded transmission of the reflected light beam 122 toward the second reflector 128. As depicted, the dashboard 112 can further house a second air duct 164 for directing air flow within the passenger compartment 140. Because a light-transmitting section 166 of the second air duct 164 can be positioned adjacent to the first air duct section 146, the light-transmitting section 166 is also formed of a light-transmitting material adapted to allow transmission of the projected light beam therethrough.

The present disclosure further provides a method for presenting a graphic image in a heads-up display device 100 onto a window surface 104 of a vehicle windshield 106. The method comprises projecting a light beam 122 defining a graphic image from a projector 120 to at least one reflector housed within a dashboard 112; and reflecting the light beam toward the window surface 104. The reflecting step includes transmitting the projected graphic image through a light-transmitting section 146 of an air duct 148 housed within the dashboard 112. The exemplary method further includes forming the light-transmitting section of the air duct of a light-transmitting material. As indicated previously, the at least one reflector includes a first reflector 126 and a second reflector 128, and the method includes positioning the air duct section 146 between the first and second reflectors 126, 128. The method further includes positioning the first reflector 126 with respect to the projector 120 such that a first line of reflection 134 of the projected light beam from the first reflector 126 is directed through the light-transmitting section 146 toward the second reflector 128, and positioning the second reflector 128 with respect to the first reflector 126 such that a second line of reflection 136 of the projected light beam from the second reflector 128 is directed toward the window surface 104. The method further includes locating the projector 120 within the dashboard 112 or, alternatively, locating the projector 120 external of the dashboard 112 and generally overhead of a vehicle occupant.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A vehicle system comprising:
  a heads-up display device for use in a motor vehicle for displaying a graphic element in view of an occupant while the occupant views an environment through a display screen of the heads-up display device, the heads-up display device including a projector configured to project a graphic element on the display screen through at least one reflector housed within a dashboard;

a first air duct housed within the dashboard for directing air flow within a passenger compartment, wherein a first light-transmitting section having a closed cross-section along its longitudinal extent of the first air duct is formed of a light-transmitting material adapted to allow the projected graphic element to pass therethrough; and a second air duct housed within the dashboard for directing air flow within the passenger compartment, wherein a second light-transmitting section of the second air duct is positioned adjacent to the first light-transmitting section, the second light-transmitting section being formed of a light-transmitting material adapted to allow the projected graphic element to pass therethrough.

2. The vehicle system of claim 1, wherein the projector is external of the dashboard and is located overhead of the occupant.

3. The vehicle system of claim 1, wherein the projector is housed within the dashboard.

4. The vehicle system of claim 1 wherein at least a pair of opposed sidewalls of the first light-transmitting section is formed of a light-transmitting material.

5. The vehicle system of claim 4, wherein the entirety of the first light-transmitting section is formed of a light-transmitting material.

6. The vehicle system of claim 1, wherein the at least one reflector includes a first reflector and a second reflector, each of the first light-transmitting section and the second light-transmitting section being interposed between the first and second reflectors.

7. The vehicle system of claim 6, wherein the first reflector is oriented with respect to the projector such that a first line of reflection from the first reflector is directed through each of the first light-transmitting section and the second light-transmitting section toward the second reflector, and the second reflector is oriented with respect to the first reflector such that a second line of reflection from the second reflector is directed toward a window surface of a vehicle windshield, the window surface reflecting the graphic element toward the occupant.

8. The vehicle system of claim 7, wherein the first line of reflection is at an angle substantially normal to a sidewall of the first light-transmitting section.

9. A vehicle dashboard assembly configured for use with a heads-up display device, the dashboard assembly comprising:
   a dashboard;
   a heads-up device housed within the dashboard, the heads-up device configured to display a graphic element onto a vehicle window surface in view of an occupant, the window surface reflecting the graphic element toward the occupant, the heads-up display device including a projector configured to project the graphic element and at least one reflector configured to reflect the graphic element onto the window surface;
   a first air duct for directing air flow within a passenger compartment, a first light-transmitting section of the first air duct being entirely housed within the dashboard and positioned between the projector and the at least one reflector, wherein the first light-transmitting section is formed of a light-transmitting material adapted to allow transmission of light therethrough; and
   a second air duct for directing air flow within the passenger compartment, a second light-transmitting section of the second air duct being housed within the dashboard and positioned adjacent to the first light-transmitting section, the second light-transmitting section being formed of a light-transmitting material adapted to allow transmission of light therethrough.

10. The vehicle dashboard assembly of claim 9, wherein the at least one reflector of the heads-up display device includes a first reflector and a second reflector, the first and second reflectors flanking each of the first light-transmitting section and the second light-transmitting section.

11. The vehicle dashboard assembly of claim 10, wherein the first reflector is oriented with respect to the projector such that a first line of reflection from the first reflector is directed through each of the first light-transmitting section and the second light-transmitting section toward the second reflector, and the second reflector is oriented with respect to the first reflector such that a second line of reflection from the second reflector is directed toward the window surface.

12. The vehicle dashboard assembly of claim 9, wherein the projector is laterally spaced in a vehicle width direction from the at least one reflector.

13. A method for presenting a graphic image in a heads-up display onto a window surface of a vehicle windshield, the method comprising:
   projecting a graphic element from a projector to at least one reflector housed within a dashboard;
   reflecting the graphic element toward the window surface;
   transmitting at least one reflected graphic element through a first light-transmitting section having a closed cross-section along its longitudinal extent of a first air duct housed within the dashboard; and
   transmitting the at least one reflected graphic element through a second light-transmitting section having a closed cross-section along its longitudinal extent of a second air duct housed within the dashboard, wherein the second light-transmitting section of the second air duct is positioned adjacent the light-transmitting section of the first air duct, and each of the first light-transmitting section and the second light-transmitting section is formed of a light-transmitting material adapted to allow the at least one reflected graphic element to pass therethrough.

14. The method of claim 13, wherein the light-transmitting section of the first air duct is formed of a transparent material.

15. The method of claim 13, wherein the at least one reflector includes a first reflector and a second reflector, and the method includes positioning each of the first light-transmitting section and the second light-transmitting section between the first and second reflectors.

16. The method of claim 15, further including positioning the first reflector with respect to the projector such that a first line of reflection from the first reflector is directed through each of the first light-transmitting section and the second light-transmitting section toward the second reflector, and positioning the second reflector with respect to the first reflector such that a second line of reflection from the second reflector is directed toward the window surface.

17. The method of claim 13, further including locating the projector within the dashboard.

18. The method of claim 13, further including locating the projector external of the dashboard and overhead of a vehicle occupant.

* * * * *